US 6,741,963 B1

United States Patent
Badt et al.

(10) Patent No.: US 6,741,963 B1
(45) Date of Patent: May 25, 2004

(54) METHOD OF MANAGING A SPEECH CACHE

(75) Inventors: Daniel E. Badt, Atlantis, FL (US); Peter J. Guasti, Coral Springs, FL (US); Gary R. Hanson, Palm Beach Gardens, FL (US); Amado Nassiff, Boynton Beach, FL (US); Edwin A. Rodriguez, Juno Beach, FL (US); Harvey M. Ruback, Loxahatchee, FL (US); Carl A. Smith, Boca Raton, FL (US); Ronald E. VanBuskirk, Louisville, CO (US); Huifang Wang, Boynton Beach, FL (US); Steven G. Woodward, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 535 days.

(21) Appl. No.: 09/598,603

(22) Filed: Jun. 21, 2000

(51) Int. Cl.[7] .................................................. G10L 15/00
(52) U.S. Cl. ........................................ 704/270; 704/246
(58) Field of Search ................................ 704/246, 251, 704/252, 255, 275, 257, 270; 379/88.01

(56) References Cited

U.S. PATENT DOCUMENTS

| 5,274,560 | A | * | 12/1993 | Larue et al. .................. 364/444 |
| 5,671,328 | A | * | 9/1997 | Fitzpatrick et al. .......... 704/251 |
| 5,758,319 | A | * | 5/1998 | Knittle ........................ 704/251 |
| 5,825,921 | A | | 10/1998 | Dulong ........................ 382/181 |
| 5,937,383 | A | * | 8/1999 | Ittycheriah et al. ......... 704/255 |

FOREIGN PATENT DOCUMENTS

| WO | WO 00/38175 | 6/2000 | ........... G10L/15/18 |
| WO | WO 01/29823 | 4/2001 | ........... G10L/15/22 |

* cited by examiner

Primary Examiner—Daniel Abebe
(74) Attorney, Agent, or Firm—Akerman Senterfitt

(57) ABSTRACT

A method and a system for improving recall of speech data in a computer speech system can include a plurality of speech cache management steps including providing a speech cache, receiving a speech system input and identifying a speech event in the received speech system input, the speech event comprising speech data. Subsequently, the speech data can be compared to pre-determined speech cache entry criteria; and, if the speech data meets one of the pre-determined entry criteria, at least one entry can be added to the speech cache, the at least one entry corresponding to the speech data. Additionally, the speech data can be compared to pre-determined speech cache exit criteria; and, if the speech data meets one of the pre-determined exit criteria, at least one entry can be purged from the speech cache, the at least one entry corresponding to the speech data. The entry criteria can include frequently used speech data, recently used speech data, and important speech data. Similarly, the exit criteria can include least frequently used speech data associated with each entry in the speech cache, least recently used speech data associated with each entry in the speech cache and least important speed data associated with each entry in the speech cache.

54 Claims, 6 Drawing Sheets

METHOD OF MANAGING A SPEECH CACHE

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of speech recognition software, and more particularly, to using a speech cache in conjunction with a speech recognition application to improve system performance.

2. Description of the Related Art

Speech recognition is the process by which an acoustic signal received by microphone is converted to a set of text words by a computer. These recognized words may then be used in a variety of computer software applications for purposes such as document preparation, data entry, and command and control. Improvements to speech dictation systems provide an important way to enhance user productivity.

Some speech recognition applications cannot recognize a user spoken utterance identifying a word or a word phrase without the aid of attributes. This is particularly true of embedded speech recognition applications having limited vocabularies, such as the variety used in navigation systems in automobiles. Attributes provide the speech recognition system with supplemental information detailing the user spoken utterance. Oftentimes, for such a speech recognition system to recognize a user spoken utterance, the user must also issue a lengthy series of attributes. For example, if the user utters a phrase recognized as a speech command such as "how far" in conjunction with a speech object, "Roller Coaster World", then the system may require attributes identifying the object within the speech command. In this case, to properly identify the object "Roller Coaster World" to the speech recognition system, attributes such as "U.S.A.", "Florida", "Orlando", and "amusement park named Roller Coaster World" may be necessary. Using attributes to specify a speech object within a speech command can be analogized to navigating through a system of computer directories to find a particular computer file.

Even more troublesome is the case when the user repeatedly issues the same speech command or issues a series of subsequent speech commands involving the same object. This situation commonly occurs in the case of a user driving to a distant location for vacation. Conventional systems do not store previously issued speech commands, objects, or attributes. Thus, each time the user issues a speech command regarding a previously identified object, the user must also provide the system with the previously mentioned attributes identifying the object. For example, each user command requesting information such as the distance or route to "Roller Coaster World" must be accompanied by the lengthy list of attributes identifying "Roller Coaster World" to the system. A significant amount of time and efficiency could be gained if speech recognition systems having a limited vocabulary could more efficiently recall previously used commands or objects.

SUMMARY OF THE INVENTION

The invention disclosed herein for improving system performance of speech systems in accordance with the inventive arrangements satisfies the long-felt need of the prior art by using a speech cache and speech cache logic in conjunction with the recognition system. Such speech systems can recall particular objects or speech commands from a speech cache, thereby eliminating the need for users to continually utter redundant attributes to the speech system in an effort to properly describe a speech object. Because speech systems frequently use a set of commands or objects, the cache is a cost effective method of enhancing memory systems using statistical means, without having to resort to the expense of making the whole memory system faster.

The invention concerns a method and a system for improving recall of speech data in a computer speech system. Significantly, the speech system can be an embedded computer speech system. The method of the invention involves a plurality of speech cache management steps including providing a speech cache; receiving a speech system input and identifying a speech event in the received speech system input, the speech event comprising speech data. Subsequently, the speech data can be compared to pre-determined speech cache entry criteria; and, if the speech data meets one of the pre-determined entry criteria, at least one entry can be added to the speech cache, the at least one entry corresponding to the speech data. Additionally, the speech data can be compared to pre-determined speech cache exit criteria; and, if the speech data meets one of the pre-determined exit criteria, at least one entry can be purged from the speech cache, the at least one entry corresponding to the speech data.

In the preferred embodiment, the entry criteria comprises frequently used speech data, recently used speech data, and important speech data. Similarly, the exit criteria can comprise least frequently used speech data associated with each entry in the speech cache, least recently used speech data associated with each entry in the speech cache and least important speed data associated with each entry in the speech cache.

The method of the invention can also include a speech cache filtering process. Specifically, an embodiment incorporating speech cache filtering can compare entries in the speech cache with filtering criteria; and, sort the entries according to the filtering criteria. The filtering criteria can comprise frequency of use of speech data associated with each entry in the speech cache, least recency of use of speech data associated with each entry in the speech cache, and importance of use of speech data associated with each entry in the speech cache.

In the preferred embodiment, the speech system input can be one of a system event and a speech event. To accommodate system events, the method of the invention can further establish a table of system events and corresponding speech cache commands. Responsive to receiving a system event, the received system event can be compared to the system events in the table. If the received system event matches a system event in the table, the speech cache command corresponding to the matching system event in the table can be performed. Notably, the corresponding speech cache commands can include purge commands and add commands.

In the preferred embodiment, the comparing step can comprise evaluating the speech system input against user-configurable rules for adding and deleting from the speech cache entries corresponding to the speech data, the rules based on frequency of use of the speech data, recency of use of the speech data and importance of use of the speech data. Similarly, the comparing step can comprise the step of evaluating the speech system input against system configured rules for adding and deleting from the speech cache entries corresponding to the speech data, the rules based on a pre-specified list of speech data. Significantly, comparisons performed against the system-specified entry and exit criteria can be overridden with the comparisons performed against the user-specified entry and exit criteria In a preferred embodiment, the method of the invention can further include establishing a frequency counter for the speech data. Responsive to receiving a speech event, the frequency counter corresponding to the speech data can be incremented. Thus, the comparing step can comprise evaluating the speech system input against user-configurable rules for adding and deleting from the speech cache entries corresponding to the speech data, the rules based on frequency of use of the speech data. In that case, the frequency can be measured by the frequency counter established for the speech data. Moreover, the adding step cans be performed in response to a frequency indicated by the frequency counter exceeding a pre-determined threshold. Likewise, the deleting step can be performed in response to a frequency indicated by the frequency counter falling below a pre-determined threshold.

Advantageously, the method can further comprise the steps of sensing when the speech cache is full; and, responsive to sensing a full speech cache, purging entries from the speech cache according to pre-determined purging criteria. Notably, like the exit criteria, the purging criteria can include least frequently used speech data associated with each entry in the speech cache, least recently used speech data associated with each entry in the speech cache and least important speed data associated with each entry in the speech cache. The purging step can include the steps of: displaying a list of speech cache entries sorted according to the purging criteria; accepting confirmation from a user before purging entries in the speech cache selected for purging based on the purging criteria; and, in response to receiving the confirmation, purging the selected speech cache entries.

Finally, in an alternative embodiment of the present invention, the method can include the steps of associating expiration data with at least one entry in the speech cache; and purging the associated entries in the speech cache according to the expiration data. In the alternative embodiment, the associating step can comprise the steps of accepting user-specified expiration data; and, associating the user-specified expiration data with at least one user specified entry in the speech cache.

According to a second aspect, the invention can be a computer speech system for managing a speech cache. Significantly, the speech system can be adapted for use in a vehicle. Moreover, the speech system can be adapted for use in a vehicle navigation system. In the second aspect of the invention, the system can comprise: a speech enabled application where the speech enabled application is coupled to a speech recognition engine and the speech enabled application and the speech recognition engine are configured to process speech data. Also included is a speech cache for storing entries corresponding to the speech data and predetermined speech cache entry and exit criteria. The entry criteria specify rules for adding entries corresponding to the speech data to the speech cache. Similarly, the exit criteria specify rules for purging entries corresponding to the speech data from the speech cache. Finally, the system can include speech cache logic for comparing the speech data to the pre-determined entry and exit criteria. The speech cache logic can add to the speech cache at least one entry corresponding to speech data meeting the pre-determined entry criteria. Likewise, the speech cache logic can purge from the speech cache at least one entry corresponding to speech data meeting the pre-determined exit criteria.

In the preferred embodiment, the speech cache is a circular cache. Moreover, the entries in the speech cache comprise speech commands, speech objects, pointers to speech commands and pointers to speech objects. The entries can further comprise at least one entry having corresponding expiration data. In that instance, the speech cache logic can purge the at least one entry having corresponding expiration data according to the expiration data.

In the preferred embodiment, the speech cache logic is adapted to receive system events in the speech system. The speech cache logic can further include a table of system events and corresponding speech cache commands. The speech cache logic can be adapted to perform a speech cache command in response to receiving a corresponding system event. Notably, the pre-determined entry and exit criteria can include a speech cache command, frequency of use of the speech data, recency of use of the speech data and importance of use of the speech data. Moreover, the speech cache command can include an add command and a purge command.

The system can further include pre-determined purging criteria. Where the system includes purging criteria, the speech cache logic, in response to receiving the purge command, can purge entries in the speech cache according to the purging criteria. Like the pre-determined exit criteria, the pre-determined purging criteria can include frequency of use of the speech data corresponding to the entries in the speech cache, recency of use of the speech data corresponding to the entries in the speech cache and importance of use of the speech data corresponding to the entries in the speech cache. Finally, a system in accordance with the inventive arrangements which incorporates purging criteria can further include a display for displaying to a user a list of entries in the speech cache selected for purging based on the purging criteria. As such, the system can confirm the purge command before purging the selected entries.

The speech cache logic can further comprise filtering logic for sorting the entries in the cache according to pre-determined filtering criteria. Like the entry criteria, the filtering criteria can comprise frequency of use of the speech data corresponding to the entries, recency of use of the speech data corresponding to the entries and importance of use of the speech data corresponding to the entries. Notably, in the preferred embodiment, the speech cache logic can further comprise at least one incrementable frequency counter corresponding to particular speech data. In consequence, the frequency of use of the particular speech data can be indicated by the frequency counter. In the preferred embodiment, the frequency counter can be incremented in response to the speech cache logic receiving an instance of the particular speech data from the speech system.

According to a third aspect, the invention may comprise a machine readable storage, having stored thereon a computer program having a plurality of code sections executable by a machine for causing the machine to perform the above-described method of the invention.

BRIEF DESCRIPTION OF THE DRAWINGS

There are presently shown in the drawings embodiments which are presently preferred, it being understood, however, that the invention is not so limited to the precise arrangements and instrumentalities shown, wherein.

DETAILED DESCRIPTION OF THE INVENTION

A speech system in accordance with the inventive arrangements can combine a speech recognition engine, speech caching logic and one or more memory caches. The speech caching logic operating in conjunction with a speech cache and a speech recognition engine can store in the speech cache speech data. Cache entry criteria contained in the speech caching logic can determine when entries associated with particular speech data are stored in the speech cache. Likewise, cache exit criteria contained in the speech caching logic can determine when entries associated with particular speech data are removed from the speech cache.

Speech data which can be stored in the speech cache can include speech commands, speech objects and attributes of speech objects. A speech object can represent a destination, location, noun, or other word recognizable by the speech system for which the speech system has retrievable data. In comparison, a speech command can be an instruction recognizable by the speech recognition engine for instructing the speech system to compute a value, perform a function, or retrieve user specified data based upon the speech object specified by the user in conjunction with the speech command.

The present invention has particular application in an embedded speech system. Notably, speech objects and speech commands in an embedded speech system can be accessed through a nested structure, for example a menu hierarchy. As a result, generally, a user of an embedded speech system is compelled to audibly traverse the menu hierarchy each time the user specifies a particular speech object or speech command. However, an embedded speech system in accordance with the inventive arrangements can recall particular speech objects or speech commands from the speech cache, thereby eliminating the need for users of the embedded speech system to repeatedly and audibly traverse a menu hierarchy in the embedded speech system in an effort to properly specify a speech object or speech command. Hence, because embedded speech systems frequently include a discreet set of speech objects and speech commands, a speech cache in accordance with the inventive arrangements can be a cost effective mechanism for enhancing the speed in which a user can specify a speech object or speech command.

Figure 1:
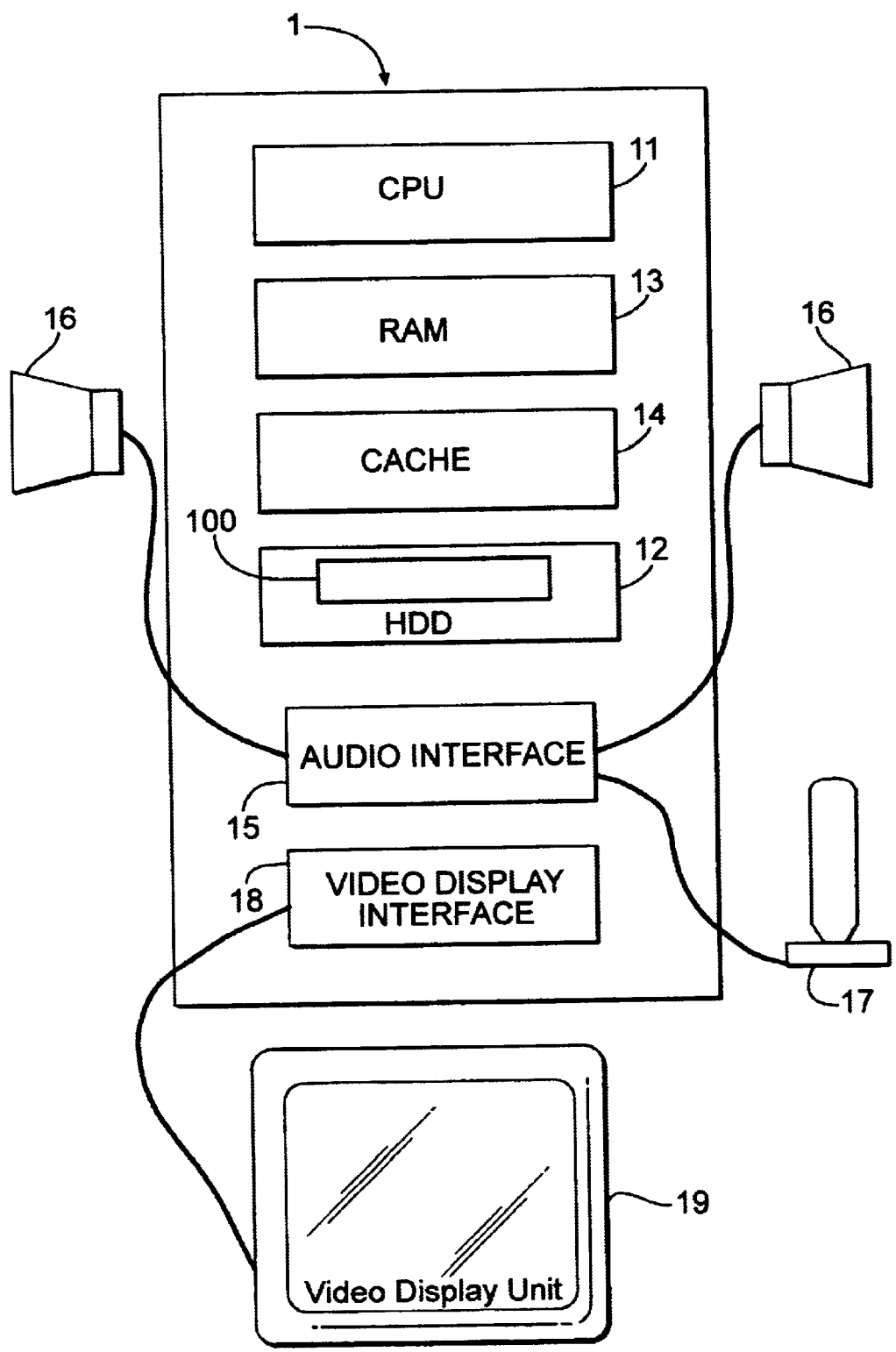
FIG. 1 is a block diagram which illustrates an embedded computer system suitable for use with a speech system.

FIG. 1 illustrates a typical embedded computer system 1 for use in conjunction with the present invention. The embedded computer system 1 is preferably comprised of a central processing unit (CPU) 11, one or more memory devices, including random access memory (RAM) 13, cache memory 14, and fixed storage 12. The CPU can be comprised of any suitable microprocessor or other electronic processing unit, as is well known to those skilled in the art. An example of such a CPU would include the Pentium III microprocessor available from Intel Corporation, the PowerPC microprocessor available from International Business Machines Corporation of Armonk, N.Y., the Athlon microprocessor available from AMD Corporation of Sunnyvale, Calif., or the StrongARM processor available from ARM Ltd. of Cambridge, England or any similar microprocessor.

Preferably, the embedded computer system 1 can include a video display unit 19 and a corresponding video display interface 18 for providing visual output on the video display unit 19. Although a control input device, for example a keyboard or mouse (not shown), can be included with the embedded computer system 1, neither is necessary for the operation of the present invention. Rather, the embedded computer system 1 can be controlled through either a touch screen overlay on the video display unit 19, or through an audio user interface.

The audio user interface can include means for audio input, output and suitable audio processing componentry. In the preferred embodiment, the speech interface can include audio interface circuitry 15, for example a sound board, for processing audio input and output. Also, the speech interface can include a microphone 17 for receiving audio input, and speakers 16 for providing audio output.

The cache memory in the speech system, referred to hereinafter as a speech cache, can be a small, separate memory system which can selectively store data previously accessed in a larger memory system. Notably, the speech cache can be comprised of one larger cache or several smaller independent caches. The cache can be implemented either in dynamic memory or fixed memory. In either case, the cache can be any suitable data structure, for example, a list, array, tree, or table. Additionally, the speech cache can be implemented as a circular cache, wherein a portion of the regular memory is partitioned off from the main memory for use as a speech cache.

In a traditional caching architecture, when the CPU performs a read operation, the caching logic can inspect the cache to determine if requested data is stored in the cache. If so, then the cache can expediently provide the requested data to the CPU without compelling the CPU to further access the slower, main memory. However, if the requested data is not present in the cache, then the CPU can retrieve the requested data from the slower, main memory. Subsequently, the caching logic can store a copy of the retrieved data in the cache. Thus, subsequent recall of the data is faster when the requested data resides in the cache.

Significantly, the cache has a limited capacity to store data. Hence, as is apparent from the operation of the cache, the larger the cache, the more instructions and data the cache can store, and the more likely the requested item will be in the cache. However, the size limitation of a high speed cache necessitates logic for purging data from the cache. Specifically, when the cache becomes full, the caching logic can discard selected data in the cache. Notably, the selection strategy for discarding data in the cache can vary according to configurable priorities. As an example, typical caching architectures can discard stale data having been stored in the cache, but not recently accessed. Alternatively, data least frequently accessed can be discarded. Finally, data having a data size exceeding a pre-determined threshold can be discarded. Nevertheless, the invention is not limited in regard to the purging algorithm. Rather, any purging algorithm can suffice.

The various hardware requirements for the embedded computer system 1 as described herein can generally be satisfied by any one of many commercially available high speed embedded computer systems offered by manufacturers such as Applied Data Systems of Columbia, Md., Micro/

Figure 2:
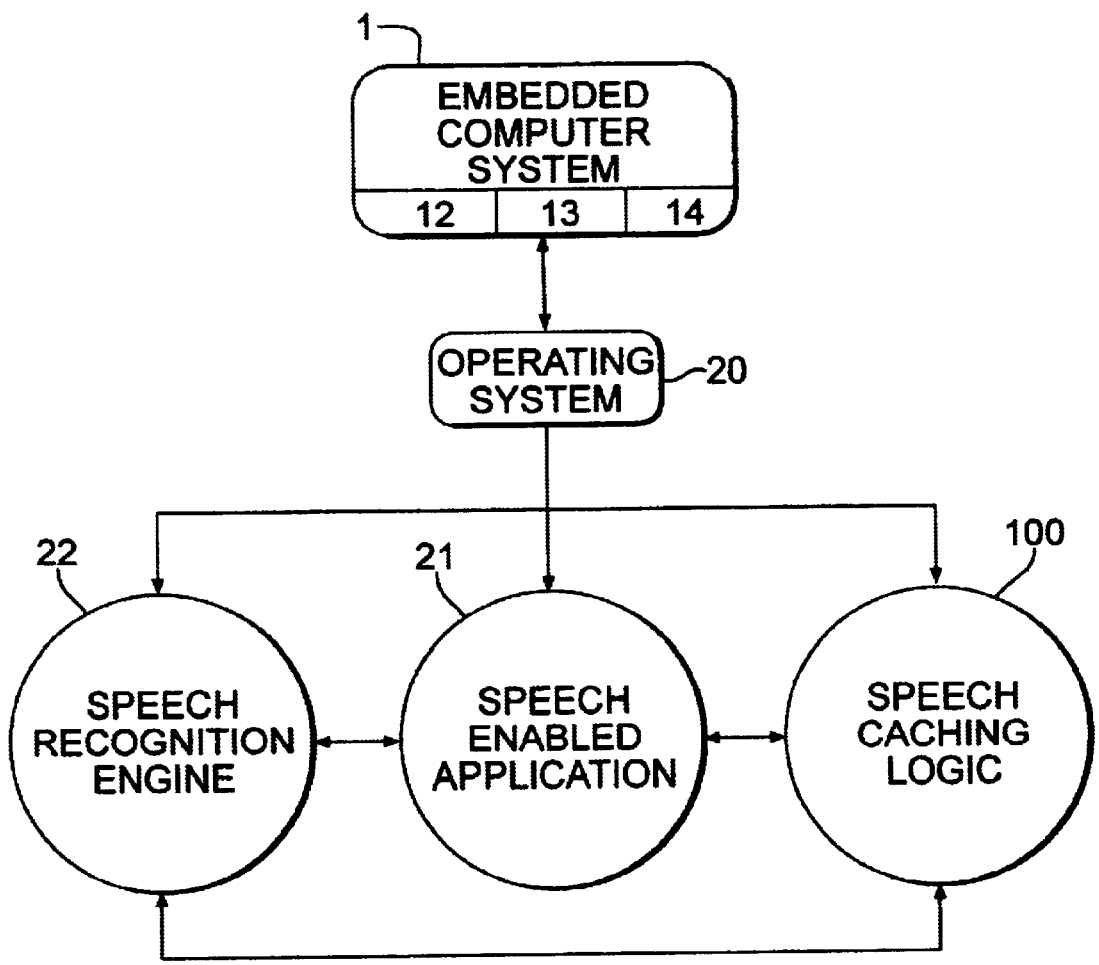
FIG. 2 is a block diagram showing a typical high level architecture for the embedded computer system in shown in FIG. 1.

Sys of Glendale, Calif., or Hewlett-Packard Corporation of Palo Alto, Calif. Still, the invention is not limited in this regard. Rather, the present invention can operate with any suitable embedded computer system having the above-described componentry. Moreover, the present invention can operate equally as effectively in a personal computer setting, wherein the personal computer can be any one of the commercially available high speed multimedia personal computers, for example those multimedia computers manufactured by International Business Machines Corporation or Armonk, New York FIG. 2 illustrates a typical architecture for a speech system incorporating speech caching logic in the embedded computer system 1 of FIG. 1. As shown in FIG. 2, the architecture can include an operating system 20, a speech recognition engine 22 and speech caching logic 100. In the example shown, a speech enabled application 21, for example a speech enabled vehicle navigation program, is also provided. However the invention is not limited in this regard and the speech recognition engine 22 can be used with any other application program which is to be speech enabled.

In FIG. 2, the speech recognition engine 22, speech enabled application 21, and the speech caching logic 100 are shown as separate application programs. It should be noted however that the invention is not limited in this regard, and these various application programs could be implemented as a single, more complex applications program. For example the speech recognition engine 22 could be combined with the speech enabled application 21 or with the speech caching logic 100.

In a preferred embodiment which shall be discussed herein, operating system 20 is one of the Windows family of operating systems, such as Windows NT, Windows 98 or Windows CE which are available from Microsoft Corporation of Redmond, Wash. However, the system is not limited in this regard, and the invention can also be used with any other type of computer operating system, for example the PalmOS which is available from Palm, Inc. of Santa Clara, Calif. The system as disclosed herein can be implemented by a programmer, using commercially available development tools for the operating systems described above.

As shown in FIG. 2, the embedded computer system 1 includes an electronic random access memory (RAM) 13, fixed storage 12, such as a hard disk drive (HDD), and a speech cache 14. Although FIGS. 1 and 2 depict the RAM 13 as being separate from the speech cache 14, alternatively, the RAM 13 can be partitioned to form a speech cache 14 within the RAM 13. Each of the operating system 20, speech recognition engine 22, speech enabled application 21 and the speech caching logic 100 can be permanently stored in the fixed storage 12. Upon bootstrap, the embedded computer system 1 can load the operating system 20 into RAM 13. In turn, the operating system 20 can cause the execution of each of the speech recognition engine 22, the speech enabled application 21 and the speech caching logic 100. Upon execution, each of the speech recognition engine 22, the speech enabled application 21 and the speech caching logic 100 can be loaded into RAM, as well, and each machine instruction incorporated therein can be executed by the CPU 11.

In operation, audio signals representative of sound received in microphone 17 are processed within the embedded computer system 1 using conventional audio circuitry contained in the audio interface 15 so as to be made available to the operating system 20 in digitized form. The processed audio signals received by the operating system 20 are conventionally provided to the speech recognition engine 22 in order to perform speech recognition functions. As in conventional speech recognition systems, the audio signals are processed by the speech recognition engine 22 to identify words spoken by a user into the microphone 17. The identified words subsequently can be provided to the speech enabled application 21 as speech data for use in the operation of the same. Exemplary uses of the speech recognized words can include audio command and control or data entry.

Upon receiving the speech data, the speech enabled application 21 can submit the speech data to the speech caching logic 100 for further processing. Notably, the speech caching logic 100 can subject the speech data to entry criteria to determine whether an entry corresponding to the speech data should be added to the speech cache. In so doing, the speech caching logic can further examine the speech cache to determine which, if any, entries in the speech cache should be purged therefrom.

FIGS. 3A through 3D, taken together, are a flow chart illustrating a method of managing a speech cache in a speech system. In general, the invention disclosed herein can respond to an input in the form of a user utterance, referred to as a speech event. Additionally, the invention can respond to system events, for example hardware or software events. In consequence, the invention can identify whether a received input is a speech event, a hardware event, or a software event. Whereas a software event can be a software generated event, for example an indication from the speech caching logic that the speech cache is full, a hardware event can be a hardware generated event, for example, an indication from an automobile that the engine has been turned off.

The method of the invention can compare the input to speech cache entry and exit criteria in order to determine whether to perform one or more additions to the speech cache, or one or more deletions from the speech cache. Moreover, a speech system in accordance with the inventive arrangements can filter the speech cache to re-order speech entries in the speech cache according to configurable criteria. Alternatively, a speech system in accordance with the inventive arrangements can filter the speech cache to prioritize speech entries in the speech cache.

Figure 3A:
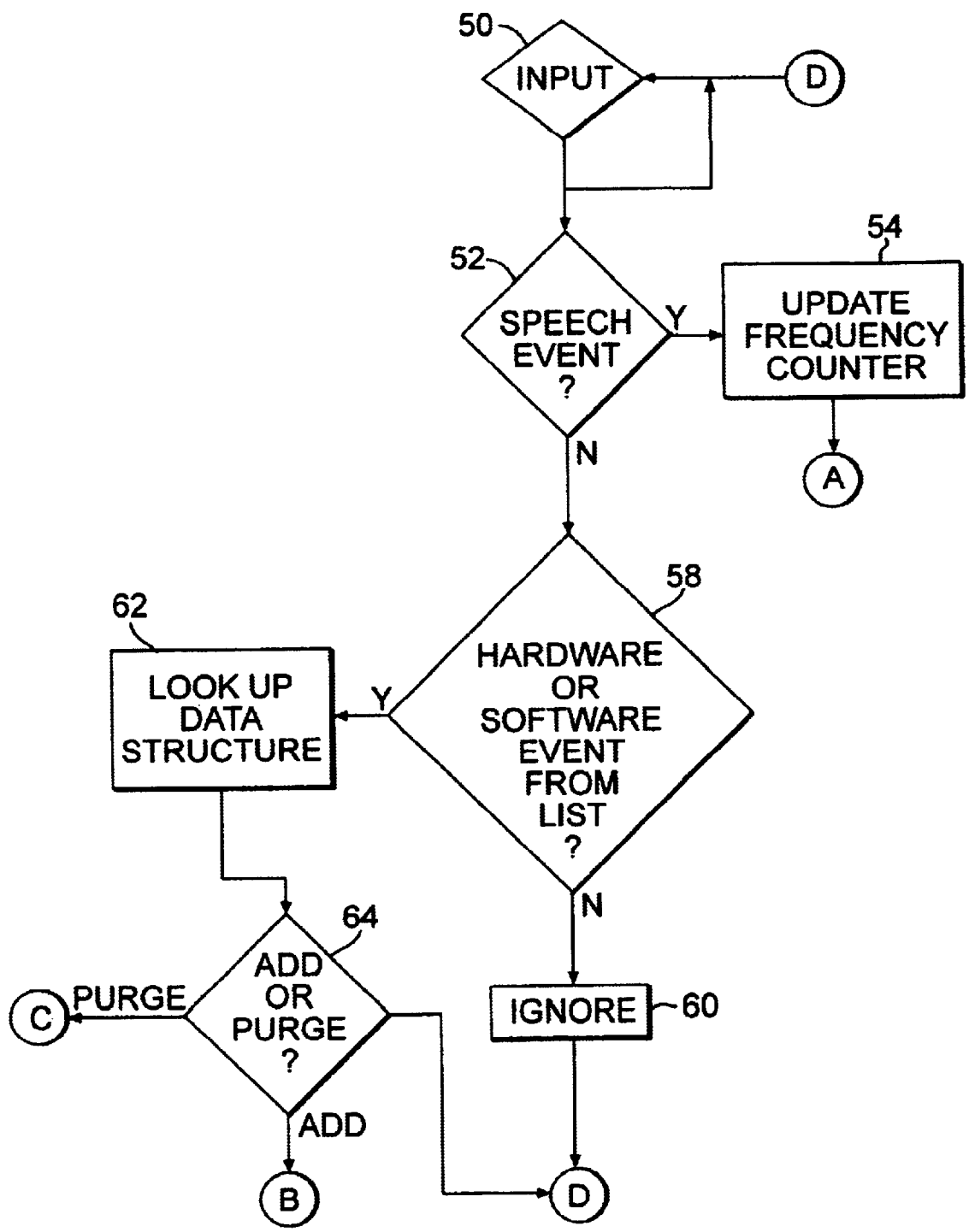
FIGS. 3A through 3D, taken together, are a flow chart illustrating a method of managing a speech cache in a speech system.

In FIG. 3A, the method in accordance with the inventive arrangements begins with step 50. In step 50 the speech caching logic 100 enters a continuous loop until the receiving an input from the speech recognition engine 22, the operating system 20, or the speech enabled application 21. For example, in the case of an input received from the speech recognition engine 22 or the operating system 20, the input can be generated via software or hardware. In the case of an input received from the speech enabled application 21, the input can be generated from a user. If the system receives an input in step 50, then the system continues to step 52. If not, then the system remains idle until receiving an input in step 50.

In step 52, the speech caching logic 100 can determine whether the input received in step 50 is a speech event, which is a user spoken utterance comprising a speech object, attributes of the speech object, a speech command, extraneous words, or any combination thereof. In this context, a speech object can represent a destination, location, noun, or other word which the speech system recognizes and has retrievable data. The speech command can be an instruction to compute a value, perform a function, or retrieve user specified data based upon the speech object specified by the user in conjunction with the speech command. A user utterance not recognized by the speech system as a speech object, an attribute of a speech object, a speech command, extraneous words between speech commands and speech objects, or combinations thereof can be ignored by the speech caching logic 100 and may not be considered a speech event.

An example of a speech event can be "how far to Roller Coaster World". Within the speech event, the speech system can identify the speech object "Roller Coaster World" and the speech command "how far". It should be appreciated that speech commands further can be user requests for information, user requests to add an entry to the speech cache, or user requests to remove an entry from the speech cache. Further, user spoken utterances containing extraneous words in addition to speech commands and speech objects can also be recognized and executed by the speech system. For example, the word "to" in the user spoken utterance "how far to Roller Coaster World" can be recognized by the speech system as an extraneous word which is not necessary to perform the user specified speech command. However, the speech system can parse the user utterance, breaking the utterance down into its component parts, in this case a speech object, a speech command, and an extraneous word to be ignored. This feature makes the speech system more user friendly, thereby allowing the speech system to more closely reflect a natural language syntax, as opposed to only a strict syntax of commands. In any case, in step 52, if the input received in step 50 is a speech event, then the speech caching logic 100 proceeds to step 54. If not, then the speech caching logic 100 proceeds to step 58.

Continuing with step 54, where the input was determined to be a speech event, the speech caching logic 100 updates a frequency counter associated with the particular speech event received in step 50. Specifically, the speech caching logic 100 can assign one frequency counter to each speech command and speech object. It should be appreciated that the speech caching logic 100 can consider the speech event "how far to Roller Coaster World" to be a different speech event than "how far to Orlando" because of the different speech objects contained in each speech event. Consequently, each speech command and each speech object can be assigned a unique frequency counter.

Frequency counters can be implemented using memory locations for storing numerical values associated with each particular speech command and speech object received by the system. The numerical values can represent the number of times each particular speech command and speech object has been received by the speech caching logic 100, and therefore, can represent a frequency value for the components comprising each speech event. It should be appreciated that the only constraint upon the number of frequency counters used by the speech caching logic 100 is the amount of computer memory available. Each time a particular speech command is received, the speech command's corresponding frequency counter can be incremented. For example, if the speech caching logic 100 identifies the speech event "how far to Roller Coaster World" from the input received at step 50, then the speech caching logic 100 can increment both the frequency counter associated with the speech command "how far", and the frequency counter associated with the speech object "Roller Coaster World" by one.

Figure 3B:
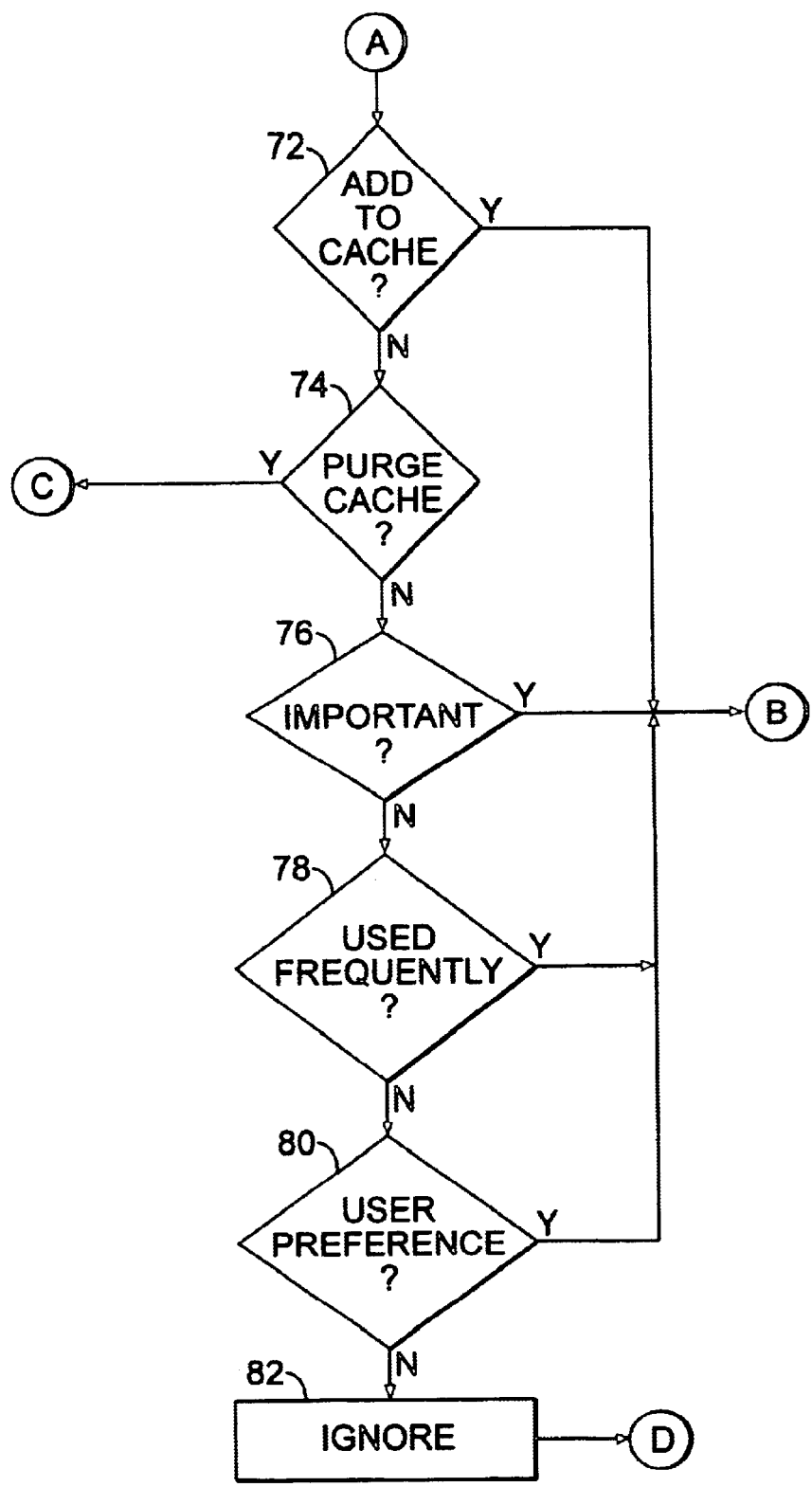

Continuing from step 54 to jump circle A in FIG. 3A to jump circle A in FIG. 3B, the speech caching logic 100 can begin a process of determining whether the speech event satisfies entry criteria or exit criteria for adding or removing an entry in the speech cache, respectively. An entry in the speech cache can consist of a speech command, a speech object, a pointer to a speech command, a pointer to a speech object, or any combination thereof. Pointers to either a speech object or a speech command can contain a reference to a memory location in main memory containing the speech object or the speech command, respectively.

Entry criteria can be specified by both the system and the user. Examples of system specified entry criteria can include, but are not limited to, recently used speech commands, frequently used speech commands based upon the frequency counter, or important speech commands. User specified entry criteria allow the user to define entry criteria in addition to system specified entry criteria. Alternatively, user specified entry criteria allow the user to override system specified entry criteria. Examples of user specified entry criteria can include, but are not limited to, user requests to add speech commands to the speech cache, important speech commands defined by the user, or user defined priority speech commands. It should be appreciated that any combination of the preceding entry criteria can be used by the speech caching logic to determine whether an entry should be added to the speech cache and the invention is not so limited by the particular entry criteria disclosed.

Turning now to FIG. 3B, in step 72, the speech caching logic 100 can determine whether the speech event is a user speech command requesting that an entry be added to the speech cache. Such a command enables the user to directly command the speech caching logic 100 to add an entry in the speech cache. Speech objects and attributes referenced by the "add" command meet the entry criteria simply because those speech objects and attributes have been explicitly commanded to be added to the speech cache. For example, the user utterance "add Roller Coaster World for one week" can be a command instructing the speech caching logic 100 to make an entry in the speech cache for the speech object "Roller Coaster World", and further, to preserve the entry in the speech cache for a period of one week. Hence, if the speech event is identified as a speech command instructing that an entry be made to the speech cache, then the speech caching logic 100 continues to jump circle B. Otherwise, the speech caching logic 100 continues to step 74.

In step 74, the speech caching logic 100 can determine whether the speech event is a user speech command requesting that an existing entry in the speech cache be deleted from the speech cache. Speech objects and attributes referenced in conjunction with the purge command meet the exit criteria simply because those speech objects and attributes have been explicitly commanded to be deleted from the speech cache. For example, the user utterance "remove all entries containing Roller Coaster World" instructs the speech caching logic 100 to remove each entry in the speech cache associated with or containing the speech object "Roller Coaster World". Thus, the speech object "Roller Coaster World" meets exit criteria because the object was referenced in conjunction with the purge command for removing entries from the speech cache. If the speech event is a purge command, then the speech caching logic. 100 proceeds to jump circle C. Otherwise, the speech caching logic 100 proceeds to step 76.

In step 76, the speech caching logic 100 can determine whether the speech event received is important according to either system specified criteria, user specified criteria, or both. System specified criteria can include a predetermined list of speech commands deemed important by the speech caching logic 100. Alternatively, the speech caching logic 100 can allow the user to specify which speech commands should be deemed important. For example, in an embedded speech recognition system used in an automobile navigation system, system specific criteria can include speech events containing objects such as hospitals, police stations, fire stations, or other emergency services institutions. Thus, the speech caching logic 100 can automatically consider speech events having such speech objects as important based on the likelihood that the user has an immediate need or emergency situation requiring access to the information associated with those speech objects. In the case of user defined criteria, a user can specify that any speech event containing a reference to a "golf course" should be considered an important speech event by the speech caching logic 100. Regardless of how the importance of an event is determined by the speech caching logic 100, if the speech event is determined to be important by the user, then the speech caching logic 100 continues to jump circle B. Otherwise, the speech caching logic 100 proceeds to step 78.

In step 78 the speech caching logic 100 can determine whether the speech event received is accessed frequently in the speech caching logic 100. For this determination, the speech caching logic 100 can retrieve the frequency counter value associated with the particular speech event received by the speech caching logic 100. For example, if the speech event was the user utterance "how far to Roller Coaster World", then the speech caching logic 100 can retrieve the frequency counter values associated with the speech command "how far" and the object "Roller Coaster World". If the frequency counter value is greater than or equal to a minimum pre-determined frequency value, then the speech caching logic 100 can conclude that the speech event is used frequently and the speech caching logic 100 can proceed to jump circle B. Otherwise, the speech caching logic 100 can proceed to step 80.

It should be appreciated that the minimum predetermined frequency value used by the speech caching logic 100 to determine whether a speech event occurs frequently or not can be a default system value, or preferably, a user defined value. Alternatively, the speech caching logic 100 can use the frequency value corresponding to the entry in the speech cache having the lowest associated frequency value as the minimum predetermined frequency value. In this case, the minimum predetermined frequency value can be continually adjusted by the speech caching logic 100.

In step 80, the speech caching logic 100 can determine whether the speech event meets pre-selected user specified criteria representing user preferences. Specifically, the user can specify particular criteria for speech events indicating when an entry is added to the speech cache. The user's preference for a particular entry criteria can include particular speech objects, speech commands, or speech objects and speech commands used within a particular user specified time period. The user specified criteria permits the user to tailor the operation of the speech cache to the user's needs. For example, the user can specify that for the next 7 days, the speech caching logic 100 should make an entry to the speech cache in response to speech events containing the speech object "Roller Coaster World". Furthermore, the user can specify that such references should remain in the speech cache for as long as possible, or for a user specified time period.

Using the previous embedded navigation system example, such a feature would be beneficial to vacationing users en route to Roller Coaster World in an automobile. The user can specify a time period equal to the user's vacation length. Consequently, the speech caching logic 100 can make an entry in the speech cache for each speech event containing the object "Roller Coaster World" during the time specified.

If desired by the user, this feature can override other user-specified and system-specified entry criteria. Thus, for the time the user is on vacation, the user need not traverse a menu hierarchy of speech objects containing the names of valid destinations, for example by specifying a string of attributes to the speech system each time the user references the object "Roller Coaster World". For instance, the user can say "how far to Roller Coaster World" as opposed to "how far to . . . U.S.A., Florida, Orlando, Amusement Park, Roller Coaster World." After the vacation is over, the speech caching logic 100 can automatically remove all entries corresponding to "Roller Coaster World", thereby freeing cache memory space for speech commands or speech objects occurring in everyday usage.

It should be appreciated that the user can specify a variety of preferences, and further, that the user can assign priorities to the preferences. In any case, the invention is not limited by the example user preferences disclosed herein. If the speech event does meet criteria consistent with the pre-defined user preferences, then the speech caching logic 100 continues to jump circle B. Otherwise, the speech caching logic 100 proceeds to step 82 where the speech caching logic 100 ignores the event and continues to jump circle D, thereby restarting the speech cache management method.

It should be appreciated that in any of the cases in which the speech caching logic 100 proceeds to jump circle B, for example from steps 72, 76, 78, or step 80, the speech event is said to have "met the entry criteria". Examples of speech events meeting entry criteria include speech events containing the "add" command, important speech objects or speech commands, speech objects or speech commands having high frequencies of access, or user specified speech objects or speech commands.

Returning now to FIG. 3A, if the input received in step 50 is not a speech event, but rather a non-speech event such as a hardware or software generated event, then the speech caching logic 100 proceeds from step 52 to step 58. In step 58 the speech caching logic 100 can determine whether the hardware or software event received exists in a stored data structure containing hardware event and software event entries, as well as relevant attributes of each particular event stored in the data structure. If so, the speech caching logic 100 proceeds to step 62. Otherwise, the speech caching logic 100 can ignore the hardware or software event and continue to jump circle D, thereby restarting the speech cache management method.

It should be appreciated that a variety of software and hardware events can be received by the speech caching logic 100. Notably, software events and hardware events can be in the form of digitally coded information provided to the speech system as input. The term hardware event denotes a source of the event outside the speech system, for example from an external system in an automobile. Examples of hardware events can include power disruptions, system power off, system power on and the deployment of an airbag.

In contrast, software events originate from within the speech system and can indicate operational states. For example, the speech caching logic 100 can receive a software event notifying the speech caching logic 100 that the speech cache is full. Similarly, the speech caching logic 100 can receive a software event notifying the speech caching logic 100 of various types of speech system faults or speech system resets. In each case, an entry corresponding to the above-identified hardware and software events can exist in the aforementioned data structure.

Each entry in the data structure also can have associated therein corresponding attributes such as whether the hardware or software event triggers a purge or add operation in the speech cache. Additionally, particular hardware and software events can have further corresponding attributes indicating that the event should trigger the addition or deletion of one or more entries in the speech cache. For example, if the speech caching logic 100 receives a shut down hardware event, an attribute of that event can indicate that all entries of the speech cache should be removed.

In step 62, the speech caching logic 100 can retrieve the attributes associated with the entry in the data structure corresponding to the hardware or software event received. In step 64, if the attributes indicate a purge operation, also indicative that the event meets the exit criteria, then the speech caching logic 100 proceeds to jump circle C. If the attributes indicate an add operation, indicative that the event meets the entry criteria, then the speech caching logic 100 proceeds to jump circle B.

Figure 3C:
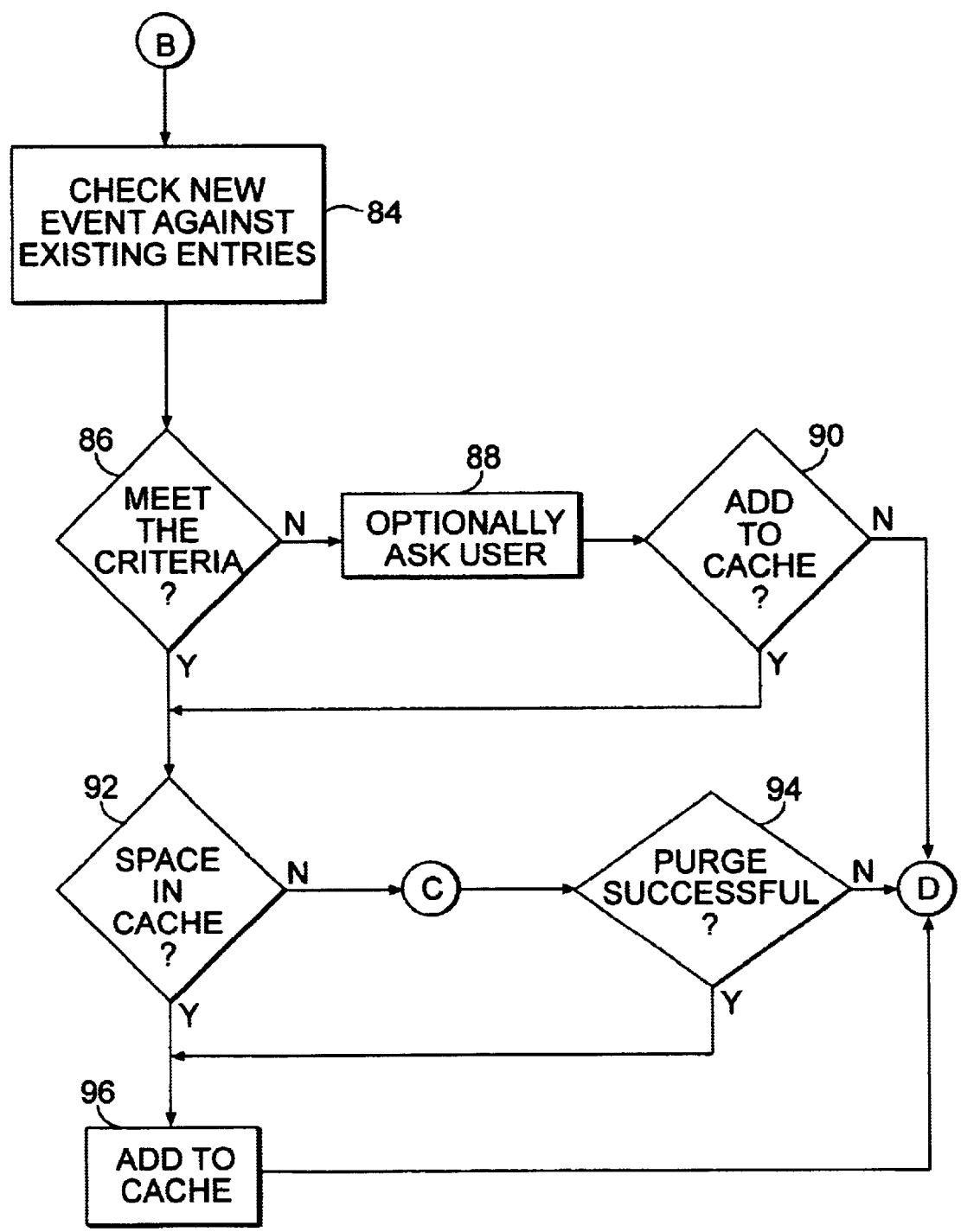

In any of the cases in which the speech caching logic 100 proceeds to jump circle B, the speech caching logic 100 continues to jump circle B in FIG. 3C. The speech caching logic 100 then continues to step 84. In step 84 the speech caching logic 100 can compare the entry criteria of the event to the entry criteria of existing entries in the speech cache. For example, if the event was a speech event and was previously considered important in step 76, then the importance of the speech event is compared to the importance of the existing speech cache entries. If the speech event was considered to be used frequently in previous step 78, then the speech caching logic 100 determines if the speech event has a higher frequency than the existing speech command entries. It should be appreciated that any entry criteria used to determine whether the speech event should be added to the speech cache can also be used in step 84 for comparison purposes. Furthermore, the speech caching logic 100 can determine the overall priority of an event relative to existing entries having different entry criteria. For example, the speech caching logic 100 can prioritize an important entry relative to a frequently used entry. Additionally, entries in the speech cache resulting from hardware events, software events, and speech events can be prioritized relative to each other based on each entry's corresponding entry criteria.

In step 86, if the event contains entry criteria having a higher priority than the lowest priority entry in the speech cache, then the speech caching logic 100 proceeds to step 92. If not, then the speech caching logic 100 proceeds to step 88. In optional step 88, the speech caching logic 100 can ask the user whether to make an entry corresponding to the event in the speech cache despite the low priority of the event. In optional step 90, if the user wants to add the entry to the speech cache, then the speech caching logic 100 proceeds to step 92. If not, then the speech caching logic 100 proceeds to jump circle D to restart the process.

In step 92, if the available memory in the speech cache is insufficient for the entry or entries to be added to the speech cache, then the speech caching logic 100 proceeds to jump circle C to initiate the purge process to free memory available for the new speech cache entry. If there is sufficient memory for the entry or entries to be added to the speech cache, then the speech caching logic 100 proceeds to step 96 where the speech caching logic 100 can perform the addition of one or more entries corresponding to the event in the speech cache.

With regard to jump circle C, after completion of the purge process, the speech caching logic 100 proceeds to step 94. In step 94 the speech caching logic 100 determines whether the purge process was successful. If so, then the speech caching logic 100 has available memory for a new entry in the speech cache. Thus, the speech caching logic 100 continues to step 96 where the speech caching logic 100 can perform the addition of one or more entries corresponding to the event in the speech cache. If the purge was not successful, then the speech caching logic 100 proceeds to jump circle D to restart the speech cache management method.

Figure 3D:
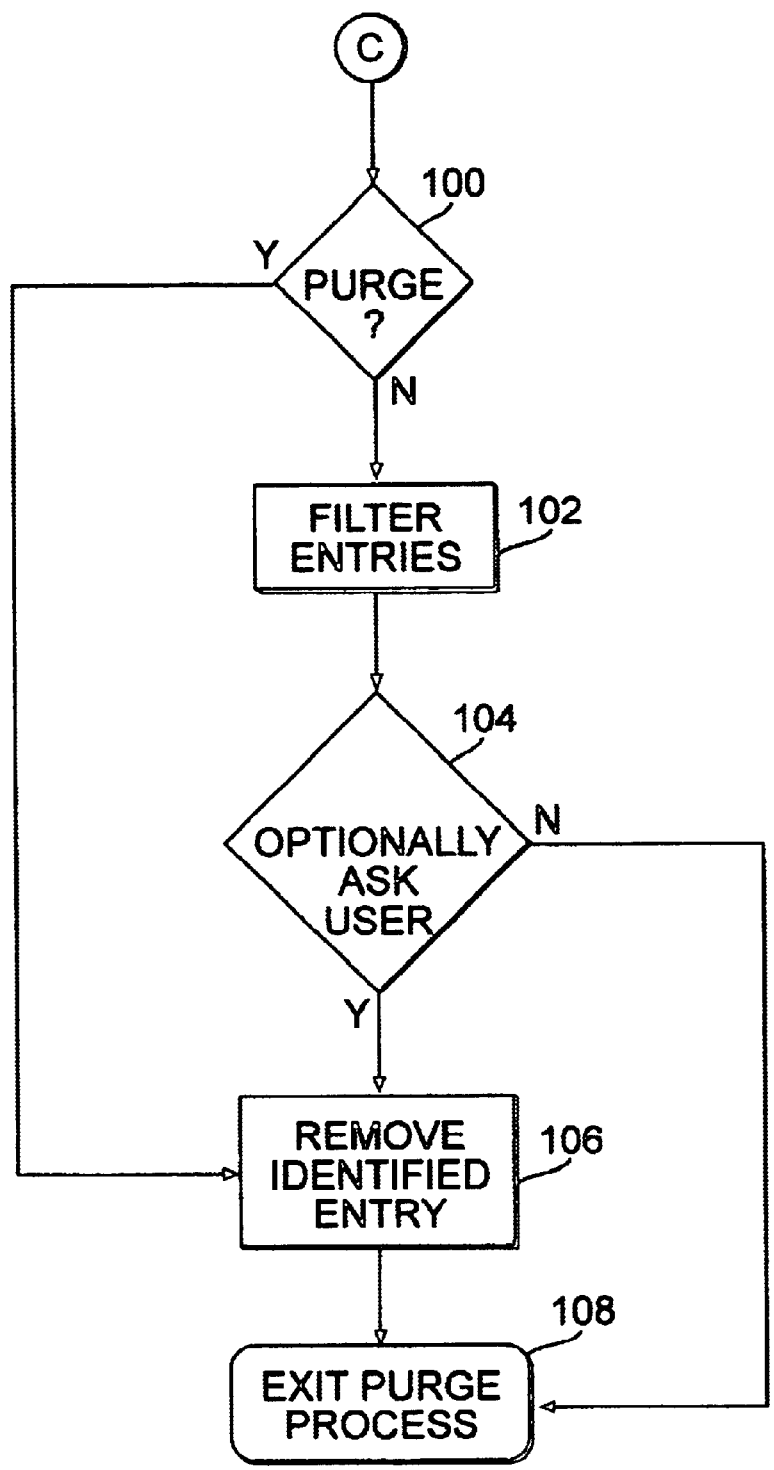

FIG. 3D illustrates the purge process and begins with jump circle C. From jump circle C, the speech caching logic 100 proceeds to step 100. In step 100 the speech caching logic 100 can determine whether the input received in step 50 was a speech event indicating a purge command. If so, then the speech caching logic 100 proceeds to step 106. For example, the user can say "purge all references to Roller Coaster World". In this case, the speech caching logic 100 can detect the command "purge all references". Because a specific object is specified, the speech caching logic 100 can proceed directly to step 106, where all entries to "Roller Coaster World" can be removed from the speech cache. If the input was not a purge command, then the speech caching logic 100 continues to step 102.

In step 102 the speech caching logic 100 can filter the contents of the speech cache. Filtering can be accomplished by identifying and re-ordering, or re-writing, the contents of the speech cache from entries of the highest priority down to entries of the lowest priority, using the same methods of comparison as in step 84. For example, frequently used entries can be prioritized among themselves and ordered from the highest frequency entry to the lowest frequency entry. A similar procedure can be implemented for entries having entry criteria consistent with user preferences such as importance. It should be appreciated that entries can be ordered among members of a similar group, such as frequency, importance, and user preferences, as well as across groups having different entry criteria.

In step 104, the speech caching logic 100 can optionally inform the user which entries in the speech cache were identified as having the lowest priority for removal. Additionally, the speech caching logic 100 optionally asks the user whether the speech caching logic 100 can remove the identified lowest priority entries from the speech cache. Entries identified as having a low priority or otherwise selected by the user for removal through the use of a purge command, are said to meet exit criteria. If the user decides to remove the identified lowest priority entries, then the speech caching logic 100 proceeds to step 106. If not, then the purge was unsuccessful and the speech caching logic 100 exits the purge process.

In step 106, the speech caching logic 100 removes the entries identified by the speech caching logic 100 as matching pre-determined exit criteria, thereby making space available for new entries in the speech cache. It should be appreciated by those skilled in the art that in the case of a circular cache, the speech caching logic 100 need not remove entries matching the exit criteria to make room for new entries in the speech cache. Rather, the speech caching logic 100 can overwrite low priority entries with entries to be added to the speech cache. In this case, the speech caching logic 100 can identify the entries having exit criteria. When an entry is later added to the speech cache, such as in step 96, the entry can be added in place of the identified entries.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. A method of improving recall of speech data in a computer speech recognition system comprising the steps of:

provide a speech cache;

receiving a speech system input;

identifying a speech event in said received speech system input, said speech event comprising speech data;

comparing said speech data to pre-determined speech cache entry criteria;

if said speech data meets one of said pre-determined entry criteria, adding at least one entry to said speech cache, said at least one entry corresponding to said speech data;

comparing said speech data to pre-determined speech cache exit criteria; and, if said speech data meets one of said pre-determined exit criteria, purging at least one entry from said speech cache, said at least one entry corresponding to said speech data.

2. The method according to claim 1, wherein said entry criteria comprises frequently used speech data, recently used speech data, and important speech data.

3. The method according to claim 1, wherein said exit criteria comprises least frequently used speech data associated with each entry in said speech cache, least recently used speech data associated with each entry in said speech cache and least important speed data associated with each entry in said speech cache.

4. The method according to claim 1, further comprising the steps of:

comparing entries in said speech cache with filtering criteria; and, sorting said entries according to said filtering criteria.

5. The method according to claim 4, wherein said filtering criteria comprises frequency of use of speech data associated with each entry in said speech cache, least recency of use of speech data associated with each entry in said speech cache, and importance of use of speech data associated with each entry in said speech cache.

6. The method according to claim 1, wherein said speech system input is selected from the group consisting of a system event and a speech event.

7. The method according to claim 6, further comprising the steps of:

establishing a table of system events and corresponding speech cache commands;

responsive to receiving a system event, comparing said received system event to said system events in said table; and, if said received system event matches a system event in said table, performing said speech cache command corresponding to said matching system event in said table.

8. The method according to claim 7, wherein said corresponding speech cache commands comprise purge commands and add commands.

9. The method according to claim 1, further comprising the steps of:

establishing a frequency counter for said speech data; and, responsive to receiving a speech event, incrementing said frequency counter corresponding to said speech data.

10. The method according to claim 1, wherein said comparing step comprises evaluating said speech system input against user-configurable rules for adding and deleting from said speech cache entries corresponding to said speech data, said rules based on frequency of use of said speech data, recency of use of said speech data and importance of use of said speech data.

11. The method according to claim 1, said comparing step comprising the step of evaluating said speech system input against system configured rules for adding and deleting from said speech cache entries corresponding to said speech data, said rules based on a pre-specified list of speech data.

12. The method according to claim 9, wherein said comparing step comprises evaluating said speech system input against user-configurable rules for adding and deleting from said speech cache entries corresponding to said speech data, said rules based on frequency of use of said speech data, said frequency measured by said frequency counter established for said speech data, said adding performed in response to a frequency indicated by said frequency counter exceeding a pre-determined threshold, said deleting performed in response to a frequency indicated by said frequency counter falling below a pre-determined threshold.

13. The method according to claim 1, wherein said comparing steps further comprises the steps of:

comparing said speech system input against system-specified entry and exit criteria and user-specified entry and exit criteria; and overriding said comparisons performed against said system-specified entry and exit criteria with said comparisons performed against said user-specified entry and exit criteria.

14. The method according to claim 1, further comprising the steps of:

sensing when said speech cache is full; and, responsive to sensing a full speech cache, purging entries from said speech cache according to pre-determined purging criteria.

15. The method according to claim 14, wherein said purging criteria comprises least frequently used speech data associated with each entry in said speech cache, least recently used speech data associated with each entry in said speech cache, and least important speech data associated with each entry in said speech cache.

16. The method according to claim 14, wherein said purging step comprises the steps of:

displaying a list of speech cache entries sorted according to said purging criteria;

accepting confirmation from a user before purging entries in said speech cache selected for purging based on said purging criteria; and, in response to receiving said confirmation, purging said selected speech cache entries.

17. The method according to claim 1, further comprising the steps of:

associating expiration data with at least one entry in said speech cache; and, purging said associated entries in said speech cache according to said expiration data.

18. The method according to claim 17, wherein said associating step comprises the steps of:

accepting user-specified expiration data; and, associating said user-specified expiration data with at least one user specified entry in said speech cache.

19. The method according to claim 1, wherein said speech system is an embedded computer speech system.

20. A speech system comprising:

a speech enabled application, said speech enabled application coupled to a speech recognition engine, said speech enabled application and said speech recognition engine configured to process speech data;

a speech cache for storing entries corresponding to said speech data;

predetermined speech cache entry and exit criteria, said entry criteria specifying rules for adding entries corresponding to said speech data to said speech cache, said exit criteria specifying rules for purging entries corresponding to said speech data to said speech cache; and, speech cache logic for comparing said speech data to said pre-determined entry and exit criteria, said speech cache logic adding to said speech cache at least one entry corresponding to speech data meeting said pre-determined entry criteria, said speech cache logic purging from said speech cache at least one entry corresponding to speech data meeting said pre-determined exit criteria.

21. The speech system of claim 20, wherein said speech cache is a circular cache.

22. The speech system of claim 20, wherein said entries in said speech cache comprise speech commands, speech objects, pointers to speech commands and pointers to speech objects.

23. The speech system of claim 20, wherein said entries further comprise at least one entry having corresponding expiration data, said speech cache logic purging said at least one entry having corresponding expiration data according to said expiration data.

24. The speech system of claim 20, wherein said speech cache logic is adapted to receive system events in said speech system.

25. The speech system of claim 24, wherein said speech cache logic further comprises a table of system events and corresponding speech cache commands, said speech cache logic adapted to perform a speech cache command in response to receiving a corresponding system event.

26. The speech system of claim 20, wherein said pre-determined entry and exit criteria comprise a speech cache command, frequency of use of said speech data, recency of use of said speech data and importance of use of said speech data.

27. The speech system of claim 26, wherein said speech cache command comprises an add command and a purge command.

28. The speech system of claim 27, further comprising pre-determined purging criteria, said speech cache logic, in response to receiving said purge command, purging entries in said speech cache according to said purging criteria.

29. The speech system of claim 28, wherein said pre-determined purging criteria comprise frequency of use of said speech data corresponding to said entries in said speech cache, recency of use of said speech data corresponding to said entries in said speech cache and importance of use of said speech data corresponding to said entries in said speech cache.

30. The speech system of claim 28, further comprising:

a display for displaying to a user a list of entries in said speech cache selected for purging based on said purging criteria; and, means for confirming said purge command before purging said selected entries.

31. The speech system of claim 20, wherein said speech cache logic further comprises filtering logic for sorting said entries in said cache according to pre-determined filtering criteria.

32. The speech system of claim 31, wherein said filtering criteria comprises frequency of use of said speech data corresponding to said entries, recency of use of said speech data corresponding to said entries and importance of use of said speech data corresponding to said entries.

33. The speech system of claim 26, wherein said speech cache logic further comprises at least one incrementable frequency counter corresponding to particular speech data, said frequency counter incremented in response to said speech cache logic receiving an instance of said particular speech data from said speech system, said frequency of use of said particular speech data indicated by said frequency counter.

34. The speech system of claim 20, wherein said speech system is adapted for use in a vehicle.

35. The speech system of claim 20, wherein said speech system is adapted for use in a vehicle navigation system.

36. A machine readable storage, having stored thereon a computer program having a plurality of code sections executable by a machine for causing the machine to perform the steps of:

receiving a speech system input in a speech cache in a computer speech recognition system;

identifying a speech event in said received speech system input, said speech event comprising speech data;

comparing said speech data to pre-determined speech cache entry criteria;

if said speech data meets one of said pre-determined entry criteria, adding at least one entry to said speech cache, said at least one entry corresponding to said speech data;

comparing said speech data to pre-determined speech cache exit criteria; and, if said speech data meets one of said pre-determined exit criteria, purging at least one entry from said speech cache, said at least one entry corresponding to said speech data.

37. The machine readable storage according to claim 36, wherein said entry criteria comprises frequently used speech data, recently used speech data, and important speech data.

38. The machine readable storage according to claim 36, wherein said exit criteria comprises least frequently used speech data associated with each entry in said speech cache, least recently used speech data associated with each entry in said speech cache and least important speed data associated with each entry in said speech cache.

39. The machine readable storage according to claim 36, for further causing the machine to perform the steps of:

comparing entries in said speech cache with filtering criteria; and, sorting said entries according to said filtering criteria.

40. The machine readable storage according to claim 39, wherein said filtering criteria comprises frequency of use of speech data associated with each entry in said speech cache, least recency of use of speech data associated with each entry in said speech cache, and importance of use of speech data associated with each entry in said speech cache.

41. The machine readable storage according to claim 36, wherein said speech system input is selected from the group consisting of a system event and a speech event.

42. The machine readable storage according to claim 41, for further causing the machine to perform the steps of:

establishing a table of system events and corresponding speech cache commands;

responsive to receiving a system event, comparing said received system event to said system events in said table; and, if said received system event matches a system event in said table, performing said speech cache command corresponding to said matching system event in said table.

43. The machine readable storage according to claim 42, wherein said corresponding speech cache commands comprise purge commands and add commands.

44. The machine readable storage according to claim 36, for further causing the machine to perform the steps of:

establishing a frequency counter for said speech data; and, responsive to receiving a speech event, incrementing said frequency counter corresponding to said speech data.

45. The machine readable storage according to claim 36, wherein said comparing steps comprises evaluating said speech system input against user-configurable rules for adding and deleting from said speech cache entries corresponding to said speech data, said rules based on frequency of use of said speech data, recency of use of said speech data and importance of use of said speech data.

46. The machine readable storage according to claim 36, said comparing step comprising the step of evaluating said speech system input against system configured rules for adding and deleting from said speech cache entries corresponding to said speech data, said rules based on a pre-specified list of speech data.

47. The machine readable storage according to claim 44, wherein said comparing step comprises evaluating said speech system input against user-configurable rules for adding and deleting from said speech cache entries corresponding to said speech data, said rules based on frequency of use of said speech data, said frequency measured by said frequency counter established for said speech data, said adding performed in response to a frequency indicated by said frequency counter exceeding a pre-determined threshold, said deleting performed in response to a frequency indicated by said frequency counter falling below a pre-determined threshold.

48. The machine readable storage according to claim 36, wherein said comparing step further comprises the steps of:

comparing said speech system input against system-specific entry and exit criteria and user-specified entry and exit criteria; and overriding said comparisons performed against said system-specified entry and exit criteria with said comparisons performed against said user-specified entry and exit criteria.

49. The machine readable storage according to claim 36, for further causing the machine to perform the steps of:

sensing when said speech cache is full; and, responsive to sensing a full speech cache, purging entries from said speech cache according to pre-determined purging criteria.

50. The machine readable storage according to claim 49, wherein said purging criteria comprises least frequently used speech data associated with each entry in said speech cache, least recently used speech data associated with each entry in said speech cache and least important speech data associated with each entry in said speech cache.

51. The machine readable storage according to claim 49, wherein said purging step comprises the steps of:

displaying a list of speech cache entries sorted according to said purging criteria; and, accepting confirmation from a user before purging entries in said speech cache selected for purging based on said purging criteria; and, in response to receiving said confirmation, purging said selected speech cache entries.

52. The machine readable storage according to claim 36, for further causing the machine to perform the steps of:

associating expiration data with at least one entry in said speech cache; and, purging said associated entries in said speech cache according to said expiration data.

53. The machine readable storage according to claim 52, wherein said associating step comprises the steps of:

accepting user-specified expiration data; and, associating said user-specified expiration data with at least one user specified entry in said speech cache.

54. The machine readable storage according to claim 36, wherein said speech system is an embedded computer speech system.

\* \* \* \* \*